US009563875B2

(12) United States Patent
Heidloff et al.

(10) Patent No.: US 9,563,875 B2
(45) Date of Patent: Feb. 7, 2017

(54) AUTOMATICALLY PROVIDING NOTIFICATIONS REGARDING INTERESTING CONTENT FROM SHARED SOURCES BASED ON IMPORTANT PERSONS AND IMPORTANT SOURCES FOR A USER

(75) Inventors: Niklas Heidloff, Salzkotten (DE); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 11/002,578

(22) Filed: Dec. 2, 2004

(65) Prior Publication Data
US 2006/0123084 A1    Jun. 8, 2006

(51) Int. Cl.
| | | |
|---|---|---|
| *G06F 15/16* | (2006.01) | |
| *G06Q 10/10* | (2012.01) | |
| *H04L 12/18* | (2006.01) | |
| *H04L 12/58* | (2006.01) | |

(52) U.S. Cl.
CPC ......... *G06Q 10/107* (2013.01); *H04L 12/1831* (2013.01); *H04L 12/587* (2013.01); *H04L 51/24* (2013.01)

(58) Field of Classification Search
CPC ..... H04L 12/1831; H04L 12/587; H04L 51/24
USPC ....................................................... 709/206
See application file for complete search history.

(56) References Cited

U.S. PATENT DOCUMENTS

| | | | | |
|---|---|---|---|---|
| 5,642,483 | A | * | 6/1997 | Topper .......................... 709/228 |
| 5,813,007 | A | * | 9/1998 | Nielsen .......................... 707/10 |
| 6,055,570 | A | * | 4/2000 | Nielsen ......................... 709/224 |
| 6,088,707 | A | * | 7/2000 | Bates ................ G06F 17/30899 |
| | | | | 707/E17.119 |
| 6,219,818 | B1 | * | 4/2001 | Freivald et al. .............. 714/799 |
| 6,249,795 | B1 | * | 6/2001 | Douglis ........................ 715/511 |
| 6,430,601 | B1 | * | 8/2002 | Eldridge et al. .............. 709/206 |

(Continued)

*Primary Examiner* — Oleg Survillo
(74) *Attorney, Agent, or Firm* — BainwoodHuang

(57) ABSTRACT

A system for automatically providing notifications to a user regarding interesting content, which automatically collects information regarding persons that are important to the user, as well as indications of important content sources. The important content sources are then monitored for actions performed by one of the important persons for the user, and notifications are generated to the user in the event that the important person performs an action on a document or other information item stored in the important content source. Important persons for a user may be determined through a communication application used by the user, such as an electronic mail program, instant messaging program, or the like, in response to indications of persons that the user has either sent messages to and/or received messages from. The notifications may be provided through the user's communication application, by electronic mail messages, instant messages, or the like. The notification may include a name, identifier, or other indication of the important person that performed the action on the important content source. Notifications may be provided to the user in response to any specific kind of action by the important persons on an important content source, such as create operations, modify operations, and/or delete operations.

9 Claims, 2 Drawing Sheets

(56) References Cited

U.S. PATENT DOCUMENTS

| | | |
|---|---|---|
| 6,681,369 B2 | 1/2004 | Meunier |
| 6,704,772 B1 | 3/2004 | Ahmed |
| 6,834,306 B1* | 12/2004 | Tsimelzon .................... 709/228 |
| 6,915,482 B2* | 7/2005 | Jellum et al. ................. 715/511 |
| 7,032,229 B1* | 4/2006 | Flores et al. ................. 719/328 |
| 7,174,377 B2* | 2/2007 | Bernard et al. .............. 709/224 |
| 7,323,999 B2* | 1/2008 | Heidloff et al. ........... 340/573.1 |
| 7,401,098 B2* | 7/2008 | Baker ....................... 707/104.1 |
| 2003/0025720 A1 | 2/2003 | Lau |
| 2003/0110056 A1* | 6/2003 | Berghofer et al. ................ 705/1 |
| 2003/0169730 A1* | 9/2003 | Narasimhan ........ H04L 12/2856 |
| | | 370/355 |
| 2003/0208549 A1 | 11/2003 | El-Shimi |
| 2004/0003352 A1* | 1/2004 | Bargeron et al. ............. 715/530 |
| 2004/0019499 A1* | 1/2004 | Murashita ........................ 705/1 |
| 2004/0056901 A1* | 3/2004 | March et al. .................. 345/811 |
| 2004/0078225 A1 | 4/2004 | Schramm-Apple |
| 2004/0143472 A1 | 7/2004 | Estrada |
| 2004/0147248 A1* | 7/2004 | Will .............................. 455/413 |
| 2004/0215793 A1* | 10/2004 | Ryan et al. .................... 709/229 |
| 2004/0261009 A1* | 12/2004 | Torigoe et al. ............... 715/500 |
| 2005/0038863 A1* | 2/2005 | Onyon et al. ................. 709/207 |
| 2005/0055450 A1* | 3/2005 | Gang ............................ 709/228 |
| 2006/0036565 A1* | 2/2006 | Bruecken .......................... 707/1 |
| 2007/0016647 A1* | 1/2007 | Gupta et al. .................. 709/206 |
| 2008/0178196 A1* | 7/2008 | Heidloff et al. .............. 719/318 |

* cited by examiner

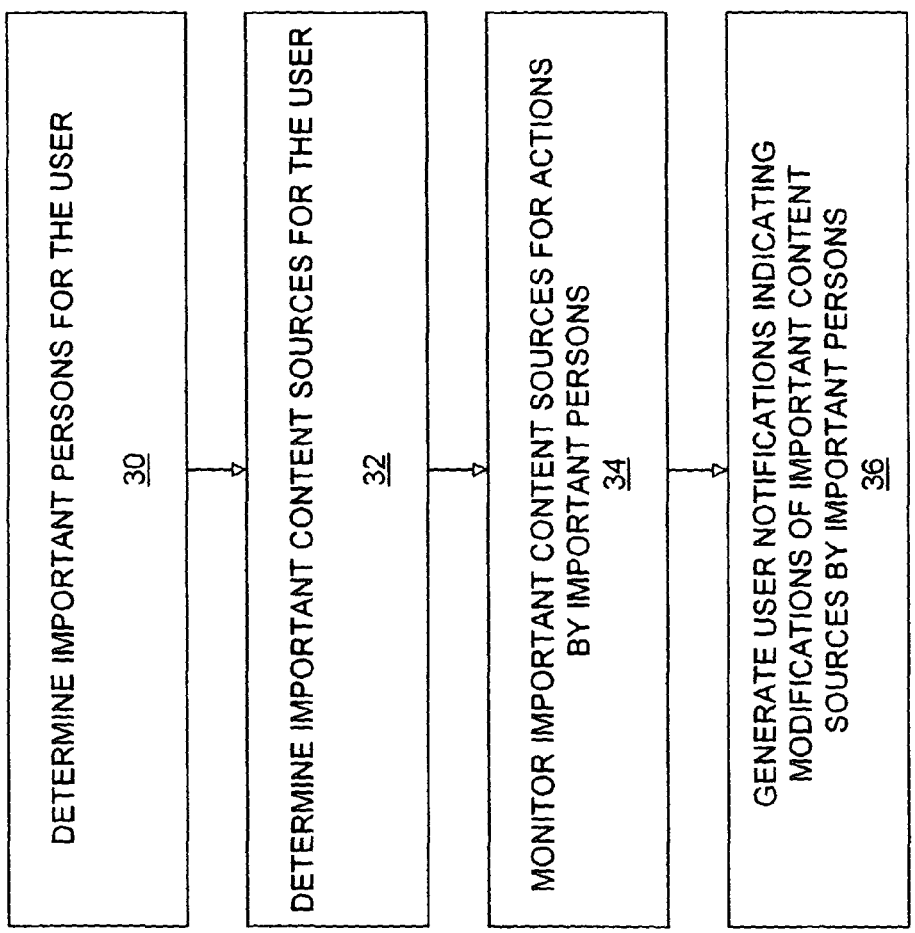

AUTOMATICALLY PROVIDING NOTIFICATIONS REGARDING INTERESTING CONTENT FROM SHARED SOURCES BASED ON IMPORTANT PERSONS AND IMPORTANT SOURCES FOR A USER

FIELD OF THE INVENTION

The present invention relates generally to computer and information processing systems, and more specifically to a method and system for automatically providing notifications regarding interesting content from shared sources based on important persons and important sources for a user.

BACKGROUND OF THE INVENTION

As it is generally known, it is often desirable for computer and information system users to know about new or changed information that may be relevant to them. Several types of existing systems have been developed to address this need. Some implementations of "team" oriented software, sometimes referred to as "groupware", allow users to share information and discuss topics. For example, IBM Lotus Notes® provides teamrooms, Quickplaces and other server side databases. IBM Lotus Workplace® also includes document libraries and discussions in Workplace Teamspaces. Additionally, over the Internet there are discussion forums and other constructs that may be used to share information among groups of users.

However, these types of existing systems have significant shortcomings. Since many users spend most of their time in their electronic mail ("email") application, they may not see changes in shared repositories, or don't see such changes until it is too late for them to take an appropriate action in response to them. For example, when users add new documents to a shared repository, other repository users may not see the new documents until it is too late, and only if/when they go to the shared repository to check for updates.

Other existing systems have used an approach to change notification based on subscriptions. Subscriptions enable users to be notified when something changes in a shared repository. One example of such an existing system is IBM Lotus Notes®, which allows users to manually add subscriptions for teamrooms, in order to receive certain change notifications.

However, there are significant problems with regard to existing subscription based solutions as well. For example, while subscriptions may be available for teamroom members or participants, users are often not aware of this feature. Additionally, existing subscription-based systems only allow subscribing to everything that is new in the shared repository, and don't provide filtering to determine the important changes for a specific user. As a result, users' notification systems, such as email inboxes, may become flooded with notifications, many of which are not interesting to the user that receives them. It is therefore difficult and time consuming for users to maintain their awareness of relevant changes in shared repositories.

For the above reasons and others, it would be desirable to have a new system for informing users regarding changes in shared repositories. The new system should not require users to expressly check the shared repositories for changes, or rely on manual subscription approaches that users may not be aware of, or provide unfiltered change notifications.

SUMMARY OF THE INVENTION

To address the above described and other shortcomings of the prior art, a new system and method for automatically providing notifications to a user regarding interesting content is disclosed, which automatically collects information regarding persons that are important to the user, as well as indications of important content sources. The disclosed system then monitors the important content sources for actions performed by one of the important persons for the user, and generates a notification to the user in the event that an important person performs an action on a document or other information item stored in the important content source.

In one embodiment, the disclosed system determines important persons for a user through a communication application used by the user. The communication application may be an electronic mail program, instant messaging program, or the like. The important persons may be determined in response to persons that the user has either sent messages to and/or received messages from. The important persons may also be determined based on the frequency of communications between them and the user, with some number or percentage of persons most frequently communicating with the user being determined to be important. The notifications generated by the disclosed system may further be provided through the communication application. For example, the notification to the user may consist of an electronic mail message, instant message, or the like. Additionally, the notification may include a name, identifier, or other indication of the important person that performed the action on the important content source. The disclosed system may be embodied to provide notifications to the user in response to any specific kind of action by the important persons on the important content source, such as create operations, modify operations, and/or delete operations.

The important content source may be determined automatically through monitoring of content accesses by the user through an application program, such as an Internet Browser or the like, or based on information input by a system administrator. Records of the notifications may further be stored in a notification log, to enable limiting of sending the notifications for actions on a given content document in the important content source to once per predetermined time period, such as once per day.

Thus there is disclosed a new system for informing users regarding changes in shared repositories that does not require users to expressly check the shared repositories for changes, and that does not rely on manual subscription approaches that users may not be aware of, and that provides filtered change notifications based on important persons and important content sources for the user.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a flow chart showing steps performed during operation of an illustrative embodiment of the disclosed system.

DETAILED DESCRIPTION OF EXEMPLARY EMBODIMENTS

Figure 1:
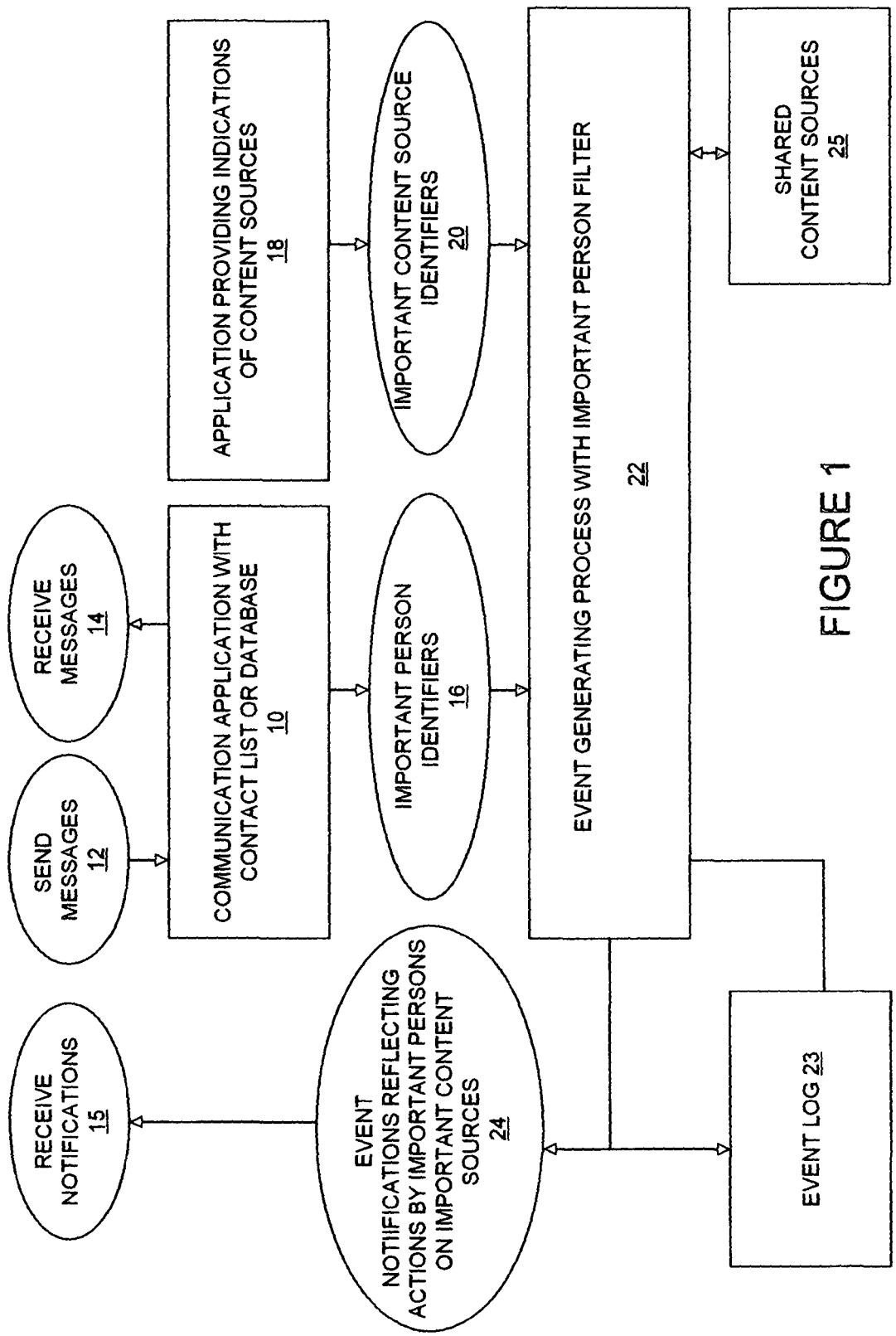
FIG. 1 is a block diagram of components in an illustrative embodiment of the disclosed system.

As shown in FIG. 1, an illustrative embodiment of the disclosed system includes a communication application 10 having a contact list or database, an event generating process 22 with an important person filter, and an application 18 providing indications of content sources. During operation of the embodiment shown in FIG. 1, a user sends messages 12 and receives messages 14 through the communication application 10. Based on the user's use of the communication application 10, for example through an address book, contact list, or similar construct, accessed and/or stored by the communication application 10, a number of important person identifiers 16 are passed to the event generating process 22. The communication application 10 may consist of an electronic mail, instant messaging, or other specific type of communication application. The important person identifiers 16 may be determined based on the destination and source fields of messages sent and received by the communication application 10. Such important person identifiers 16 may reflect all persons that the user has communicated with using the communication application 10, or consist only of some number or percentage of those persons with which the user most frequently communicates using the communication application 10. The important person identifiers 16 may be any specific kind of identifier, such as an electronic mail address, instant messaging screen name, user name, or the like.

The collection of the important person identifiers 16 by the event generating process 22 from the communication application 10 occurs automatically, without requiring the user to subscribe, register, or perform any other kind of explicit request for notifications.

The application program 18 from which the important content sources 20 are collected may consist of any application through which the user accesses content sources, such as an Internet Browser program or the like, or a system administration or management program that allows a system administrator to indicate which content sources are interesting to, and accessible by a given user. The important content source identifiers 20 may consist of any appropriate content source identifier for a given embodiment. Examples of important content source identifiers 20 include links to Web pages, file names and/or directory paths to files or documents stored on local or networked storage devices. The important content source identifiers 20 refer to content stored in the shared content sources 25, which may include any specific type of shared information repository. The important content source identifiers 20 may indicate files or documents to which accessibility is defined by associated access control lists (ACLs), or other access control mechanism. In such an embodiment, a system administrator may define both the important content sources identifiers 20 for a given user, as well as define the users for which access is provided to each document, file, content source, or other unit of content. Such controls may be provided to a system administrator, for example, through the application 18.

During operation of the embodiment shown in FIG. 1, the event generating process 22 monitors actions performed on the shared content sources 25, such as modify, delete, or add operations. If an action is detected by one of the important persons indicated by the important person identifiers 16 on content stored in the shared content sources 25 that is indicated by one of the important content source identifiers 20, an event notification 24 is generated. The event notification 24 may include an indication of the specific content that was subject to the detected action, such as a Web page, file or document identifier. The event notification 24 may further include an indication of the important person that performed the action, such as the important person identifier associated with that person.

Event notification 24 may, for example, be received 15 by the user through the communication application 10, or alternatively through some other mechanism. Accordingly, the event notification 24 may be passed from the event generating process 22 directly to the user, or to the user through the communication application 10. The user may receive the event notification 24 through their normal message receiving path provided through the communication application 10, such as the inbox of an electronic mail application program, instant messaging session, or the like.

An indication or copy of the event notification 24 may also be stored in an event log 23, providing a record of which notifications have previously been sent to the user, and at what time such notifications were sent. Based on the content of the event log 23, the event generating process 22 may operate to limit the number of times a notification is provided with regard to a given item of content. The event generating process may operate to provide event notifications regarding actions performed on a specific content item once per pre-determined or user-configured time period, such as once per day.

FIG. 2 is a flow chart illustrating steps performed in an illustrative embodiment of the disclosed system. At step 30, the important persons are determined for a given user. The determination at step 30 may be performed automatically based on actions of the user, such as monitoring of communications between the user and other persons through a communication program. Alternatively, the determination at step 30 may be in response to indications of important persons provided by the user, expressly for purposes of generating the event notifications.

At step 32, important content sources for the user are determined. The important content sources 32 may also be determined automatically, based on monitoring of user actions with regard to accessing shared data repositories. The important content sources may include shared data repositories that are accessed by the user, or that are accessed relatively more frequently by the user than other shared data repositories. Alternatively, the important content sources determined at step 32 may be provided expressly for a given user by the user, or by a system administrator through a graphical user interface or the like. At step 34, the disclosed system monitors important content sources for actions performed by important persons for the user, and generates user notifications indicating those actions at step 36.

The disclosed system advantageously enables a user to spend large amounts of time in a communication application program, without having to explicitly check shared content files or documents for changes, and still conveniently maintain an awareness of when such shared content is changed. In this way the disclosed system enables a communications program to function as a personal "portal" to a variety of applications and/or on-line activities. There is no need for a user to be aware of how the system works, to expressly subscribe to notifications, or expressly define either the important users or important content sources on which to base the generated event notifications. The disclosed system can further conveniently identify the important person that performed the action on the important content in the notification provided to the user, thus enabling the user to better determine how urgently they should review the changes made to the shared content. This information may additionally be combined in the event notification with the identifier of the important content that has been changed.

The disclosed system may thus provide event notifications based on the automatically detected relationships between people as indicated by their communications using one or more communication applications. Similarly, the set of important content sources can also be determined automatically, for example by reading the bookmarks in a user's Internet Browser program, without explicit user interaction.

The event generating process of the disclosed system may be implemented centrally within a shared database, using programming "hooks" provided in the database to allow future expansion. For example, in a shared repository consisting of an on-line discussion database, each time someone in the discussion modifies, adds or deletes a document in the discussion database, a determination would be made by the event generating process to determine which users are to be provided with event notifications, based on the important person and important content source information maintained for each member of the on-line discussion. Alternatively, the event generating and/or filtering provided by the disclosed system based on important persons and important content sources may be performed on the relevant user's system. In such an alternative embodiment, the information regarding important persons and important content sources may be collected and stored locally on the user's computer system, and may be used to generate event notifications locally on the user's system, or to filter events received from a central event notification generator.

In a use case example of an embodiment of the disclosed system, a user P1 might be a technical lead in a development team. Another person P2 on the team might need to know about specifications that P1 defines. There may further be a shared repository S in which information, including specifications, are stored. If P1 adds a new specification to S, then P2 wants to know. However, P2 does not want to be notified when other people add documents to S. An embodiment of the disclosed system may use an interest profile associated with P2, in which P1 would be listed as an important person. In addition, P2 has accessed S, which provides an indication that the source S is of special interest to him. As a result, whenever P1 adds a document to S, P2 is notified, for example by email, SIP (Session Initiation Protocol) message, or other type of message, that there is a new document in S.

The above described embodiments may be modified in various ways. For example, a mixture of automatically determined and manual inputs may be used to obtain the important persons and important sources for a user. The system may be implemented such that users can manually define the persons that are important for their daily work, and manually add links to important content sources, while indications of such important persons and important content sources are also being 'calculated' automatically. Moreover, a variety of specific approaches may used to automatically determining important persons based on the user's use of a communication application. These approaches include determinations based on frequency of communications between the user and other persons, how recently the user has communicated with other users, and other specific techniques.

Similarly, various specific techniques can be used by the disclosed system to avoid redundant notifications based on the above described notification log. The notification log may itself be used to store, and periodically obtain and send notifications regarding individual documents, for example only once a day. Alternatively, rather than sending one notification for each changed document, or for each document change, a software agent may be used to run on a scheduled basis (e.g. every night) to generate one notification for the user, including a list of links to document changes in shared sources.

FIGS. 1 and 2 are block diagram and flowchart illustration of methods, apparatus(es) and computer program products according to an embodiment of the invention. It will be understood that each block of FIGS. 1 and 2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the may be embodied using a variety of specific command structures. Accordingly, the invention should not be viewed as limited except by the scope and spirit of the appended claims.

The invention claimed is:

1. A computer implemented method for automatically providing notifications to a user regarding interesting content, comprising:

determining important persons for said user by monitoring communications of said user through an electronic mail application, wherein said determining includes automatically determining said important persons for said user responsive to said monitoring and without receiving an explicit request for notifications from said user, said automatically determined important persons for said user consisting only of a predetermined number of other users with which said user has most frequently communicated with via said electronic mail application;

determining an important content source for said user, wherein said important content source comprises a central on-line discussion database;

detecting, by an event generating process executing within said central on-line discussion database, modify operations, wherein said modify operations comprise adding at least one document to said important content source;

transmitting, to a computer of said user over a computer network and by the event generating process executing within said central on-line discussion database, at least one Session Initiation Protocol (SIP) message notifying that there is a new document in said central on-line discussion database; and filtering received messages by said computer of said user such that said user is only notified when said modify operations are performed by said important persons, without notifying said user when said modify operations are performed by users other than said important persons.

2. The method of claim 1, wherein said step of determining said important persons for said user further comprises monitoring communications of said user through an instant messaging communication application, wherein said important persons are persons said user has also communicated with through said instant messaging communication application.

3. The method of claim 1, further comprising determining another important content source responsive to input from an administrator user.

4. The method of claim 1, further comprising:
storing indication of said notification to said user in a log; and
responsive to said log, limiting subsequent notifications to said user such that only one notification regarding said important content source is provided to said user per a predetermined time period.

5. A computer program product contained in a computer readable memory, said computer readable memory having a program code for automatically providing notifications to a user regarding interesting content stored thereon, said program code comprising:
program code operative to determine important persons for said user by monitoring communications of said user through an electronic mail application by automatically determining said important persons for said user responsive to said monitoring and without receiving an explicit request for notifications from said user, said automatically determined important persons for said user consisting only of a predetermined number of other users with which said user has most frequently communicated with via said electronic mail application;
program code operative to determine an important content source for said user, wherein said important content source comprises a central on-line discussion database;
program code operative to detect, by an event generating process executing within said central on-line discussion database, modify operations, wherein said modify operations comprise adding at least one document to said important content source;
program code operative to transmit, to a computer of said user over a computer network and by the event generating process executing within said central on-line discussion database, at least one Session Initiation Protocol (SIP) message notifying that there is a new document in said central on-line discussion database; and
program code operative to filter received messages by said computer of said user such that said user is only notified when said modify operations are performed by said important persons, without notifying said user when said modify operations are performed by users other than said important persons.

6. The computer program product of claim 5, wherein said program code operative to determine said important person for said user is further operative to monitor communications of said user through an instant messaging communication application, wherein said important person is someone said user has also communicated with through said instant messaging communication application.

7. The computer program product of claim 5, further comprising program code operative to input another important content source from an administrator user.

8. The computer program product of claim 5, further comprising:
program code operative to store indication of said notification to said user in a log; and
program code operative to, responsive to said log, limit subsequent notifications to said user such that only one notification regarding said important content source is provided to said user per a predetermined time period.

9. A computer system including at least one processor and at least one computer readable memory having program code stored thereon for automatically providing notifications to a user regarding interesting content, said program code comprising:
program code for determining important persons for said user by monitoring communications of said user through an electronic mail application, wherein said determining includes automatically determining important persons for said user responsive to said monitoring and without receiving an explicit request for notifications from said user, said automatically determined important persons for said user consisting only of a predetermined number of other users with which said user has most frequently communicated with via said electronic mail application;
program code for determining an important content source for said user, wherein said important content source comprises a central on-line discussion database;
program code for detecting, by an event generating process executing within said central on-line discussion database, modify operations, wherein said modify operations comprise adding at least one document to said important content source;
program code for transmitting, to a computer of said user over a computer network and by the event generating process executing within said central on-line discussion database, at least one Session Initiation Protocol (SIP) message notifying that there is a new document in said central on-line discussion database; and
program code for filtering received messages by said computer of said user such that said user is only notified when said modify operations are performed by said important persons, without notifying said user when said modify operations are performed by users other than said important persons.

* * * * *